Nov. 21, 1944. G. SMITH 2,363,155
DISPENSING APPARATUS
Filed May 20, 1943 3 Sheets-Sheet 2

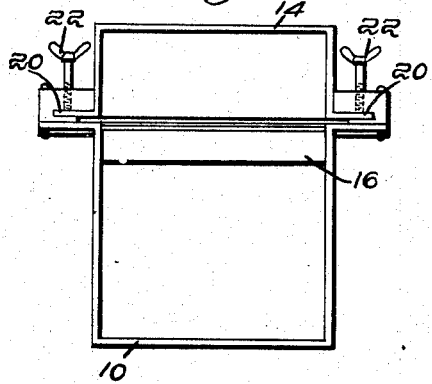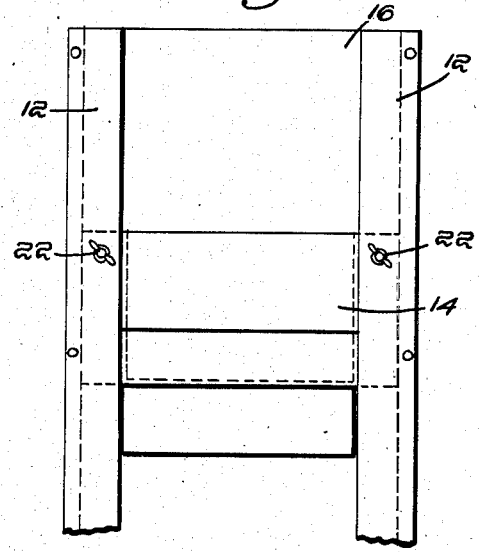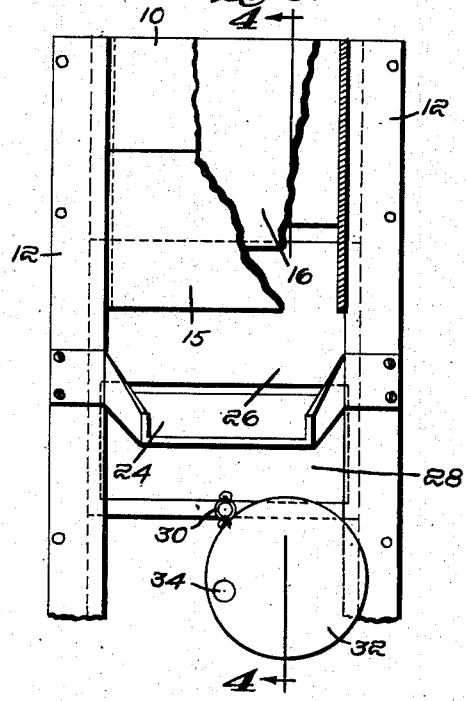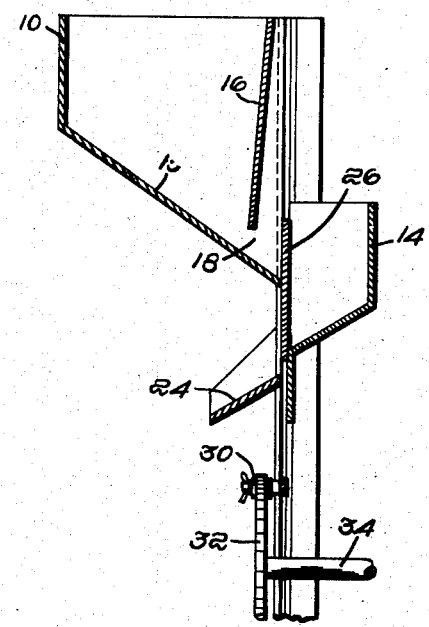

Inventor:
Graydon Smith,
by Kenway & Witter
Attorneys

Nov. 21, 1944.  G. SMITH  2,363,155
DISPENSING APPARATUS
Filed May 20, 1943  3 Sheets-Sheet 3

Inventor:
Graydon Smith,
by Kenway Witter
Attorneys

Patented Nov. 21, 1944

2,363,155

UNITED STATES PATENT OFFICE 2,363,155

DISPENSING APPARATUS

Graydon Smith, Concord, Mass., assignor to Electricooker, Inc., Newburyport, Mass., a corporation of Massachusetts Application May 20, 1943, Serial No. 487,716

7 Claims. (Cl. 222—185)

This invention relates to a novel dispensing apparatus adapted for use in packaging machines, nut cooking machines, etc., and wherever the dispensing of measured amounts of a unit or granular product is required. One important feature of the invention renders the apparatus more particularly applicable to the dispensing of frangible and brittle materials, such, for example, as shelled nuts. It is highly desirable that such materials shall remain whole and unbroken and their value and quality are greatly decreased by any crushing or breaking of the product. One of the objects of the invention resides in the production of an improved dispensing apparatus which will dispense such products without causing any crushing or breaking thereof.

The invention more particularly concerns an extremely simple dispensing apparatus embodying a hopper and a cooperating measuring chamber supported on a frame in relatively adjacent positions on opposite sides of a vertical plane therebetween, and cut-off means disposed wholly or partially within said plane and movable vertically to one position permitting flow of material from the hopper into and filling the receptacle while preventing discharge of the material therefrom and to another position cutting off such flow and permitting the discharge of the measured quantity of material from the receptacle, means being provided to vary the operative position of the receptacle vertically whereby varying the capacity of its measuring chamber. The production of such an improved and simple apparatus adapted continuously to dispense measured quantities of a frangible product without crushing or breaking it comprises a further object of the invention.

Figure 5:
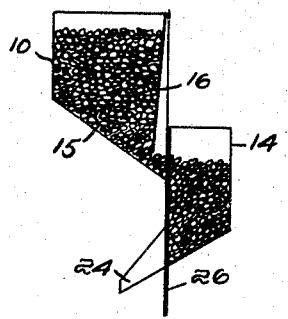
Figure 6:
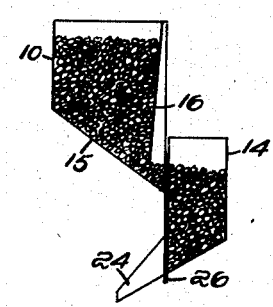
Figure 7:
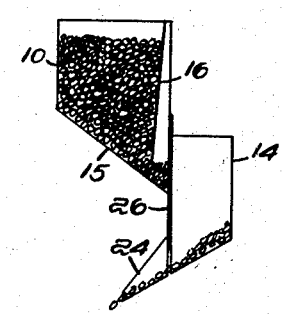
Figure 8:
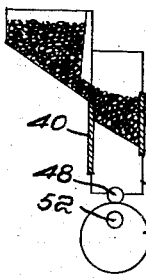
Figure 9:
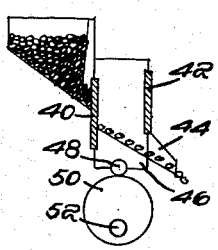
Figure 10:
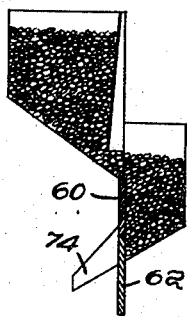
Figure 11:
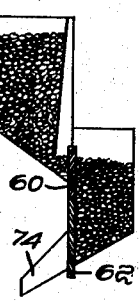
Figure 12:
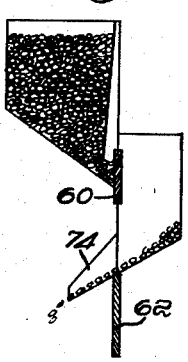
Figure 13:
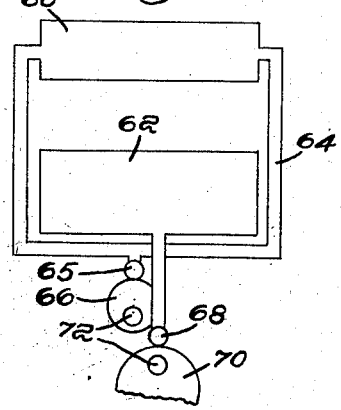
Figure 14:
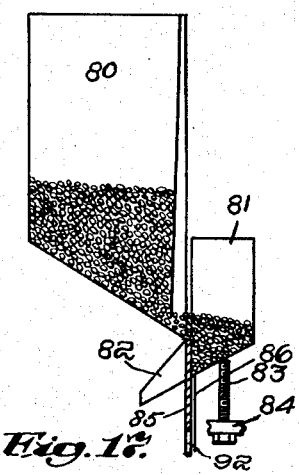
Figure 15:
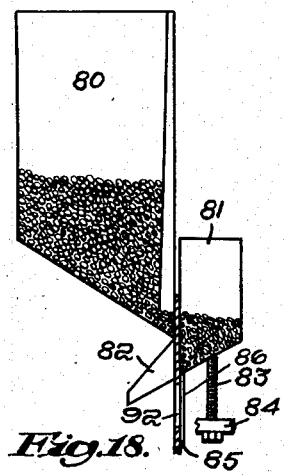
Figure 16:
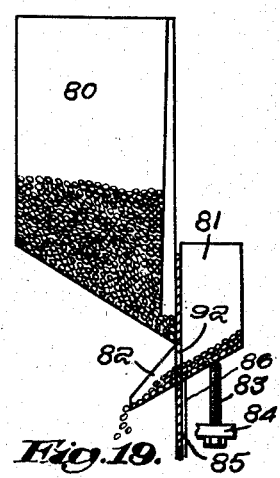
Figure 17:
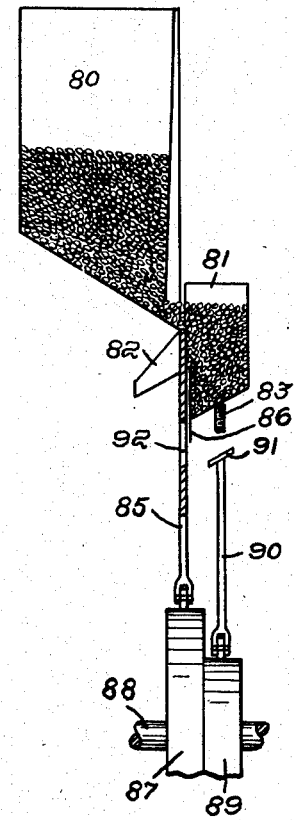
Figure 18:
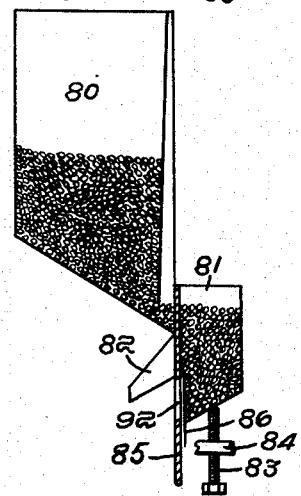
Figure 19:
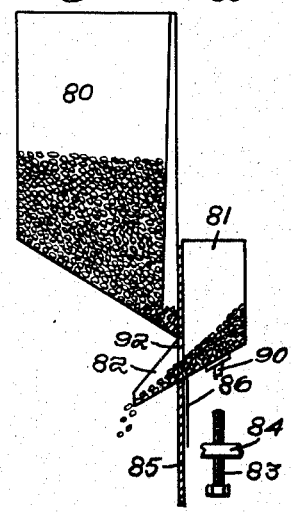
Figure 20:
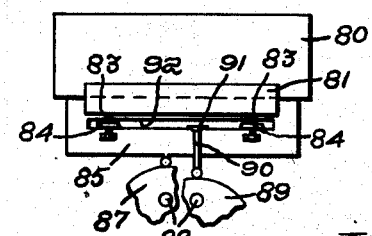

These and other features of the invention will be best understood and appreciated from the following description of a preferred embodiment thereof selected for purposes of illustration and shown in the accompanying drawings in which, Fig. 1 is a plan view of an apparatus embodying my invention, Fig. 2 is a rear elevation thereof, Fig. 3 is a front elevation, partially broken away, Fig. 4 is a sectional view taken on the line 4—4 of Fig. 3, Figs. 5, 6 and 7 are fragmentary views illustrating the dispensing steps of the apparatus employing a single cut-off plate, Figs. 8 and 9 are fragmentary views of a modified construction employing two cut-off plates operated together as a unit, Figs. 10, 11 and 12 are fragmentary views of a modified construction employing two cut-off plates in a single plane and operated in synchronism, Fig. 13 is a front elevation of the cut-off construction shown in Figs. 10–12, Figs. 14, 15 and 16 are views similar to Figs. 5–7 but showing a somewhat modified form of the invention, Figs. 17, 18 and 19 illustrate the construction of Figs. 14–16 adjusted to a position adapting it to dispense larger batches, Fig. 20 is a rear elevation of the apparatus, certain portions being shown diagrammatically.

Referring first to the form of invention shown in Figs. 1–7, a hopper 10 is supported on one side of a frame comprising two uprights 12 and a measuring receptacle 14 is supported on the opposite side of the frame, the hopper and receptacle being closely adjacent but on opposite sides of a vertical plane extending through the frame. The walls of the hopper include a bottom wall 15 sloping downwardly toward the frame and a back wall 16 extending downwardly short of the bottom wall to provide an exit passage 18.

The measuring receptacle 14 is supported on the frame in position to receive material discharged from the hopper through the passage 18. The receptacle is provided with vertically extending side flanges 20 seated in vertical guideways in the frame and by which the receptacle can be adjusted to different positions vertically. Clamping screws 22 threaded in the frame and in binding engagement with the flanges serve to hold the receptacle firmly in place. The receptacle 14 is located in position to receive the product discharged through the passage 18 to the extent of the capacity of that portion of its chamber located below the passage, and this capacity can be varied by adjusting the receptacle to different positions vertically. A discharge chute 24 is mounted on the frame beneath the hopper in position to receive the product discharged from the receptacle 14.

Flow of the product from the hopper into the receptacle 14 and from the latter to the discharge chute 24 is controlled by a cut-off plate 26 mounted for vertical reciprocation in the frame between the hopper and receptacle 14. This plate has a cut-out opening 28 adjacent to its bottom end and carries a roller 30 riding on the periphery of an eccentric 32 on a shaft 34. The eccentric is adapted to reciprocate the plate vertically to the extreme positions illustrated in Figs. 5 and 7.

When the cut-off plate 26 is in its lowermost position (Fig. 5) the product in the hopper flows downwardly through the passage 18 and fills the measuring chamber therebeneath in the receptacle 14. Upward movement of the plate separates the measured product from the product in the hopper (Fig. 6) and it will be noted that during this movement the plate is free to pass upwardly through a limited depth of the product without causing any crushing or breaking thereof. When the plate reaches the position of Fig. 7 the measured product flows from the receptacle 14 outwardly through the chute 24. The eccentric 32 is rotated at a speed which permits complete filling and discharging of the measuring receptacle.

In Figs. 8 and 9 I have illustrated my dispensing apparatus as discharging measured quantities of the product from the side of the measuring receptacle opposite to the hopper the product simply passing from the hopper through the measuring receptacle in measured batches. This apparatus is like that above described except that it employs two cut-off plates 40 and 42, the plate 40 being located between the hopper and measuring chamber and controlling the passage of material from the hopper, and the plate 42 being located between the measuring chamber and its discharge chute 44. The two plates are supported on a yoke 46 carrying a roller 48 resting on the periphery of an eccentric 50 on a shaft 52. It will be apparent that when the plates are in the down position of Fig. 8 the hopper discharges into the measuring chamber which is then closed by the plate 42. Moving of the plates to the position of Fig. 9 closes the hopper discharge passage and opens the passage to the chute 44.

In Figs. 10–13 I have illustrated the apparatus as employing two cut-off plates 60 and 62 located in a common plane between the hopper and measuring chamber. The top plate 60 is supported on a yoke 64 carrying a roller 65 resting on the periphery of a cam 66. The bottom plate 62 carries a roller 68 resting on the periphery of a cam 70. The cams are preferably mounted on a single shaft 72 (shown separately for purpose of illustration in Fig. 13) and are so shaped that they reciprocate the plates vertically through the cycle illustrated in Figs. 10–12.

In the position of Fig. 10 the two plates are juxtaposed as a single plate closing the discharge end of the chute 74 and leaving the hopper passage open to discharge into the measuring chamber. Both plates thereafter move upwardly to the position of Fig. 11 in which both passages are cut off. The lower plate 62 is then moved downwardly to the position of Fig. 12 and in which the measured batch discharges outwardly through the chute 74.

In Figs. 14–20, I have illustrated a modified form of the invention in which the measuring receptacle is adapted to be raised to dispensing position at each dispensing operation, whereby shortening the stroke required of the cut-off plate and shortening the required vertical dimensions of the apparatus. The hopper 80, measuring receptacle 81 and discharge chute 82 are like those illustrated in Figs. 5–7 except that the hopper and chute are relatively fixed and the measuring receptacle is mounted for movement vertically, the normal position of the receptacle being determined by a pair of stops 83 threaded into fixed brackets 84. In Figs. 14–16 the stops 83 are adjusted to their uppermost positions wherein they hold the receptacle flush with the discharge chute 82. In Figs. 17–19 the stops are adjusted to a position permitting dropping of the receptacle substantially below the discharge chute. It will be apparent that the dispensing capacity of the receptacle is increased as the stops are lowered.

The flow of material from the hopper 80 to the receptacle 81 and the discharging of the material from the latter are controlled by a cut-off plate 85 which extends upwardly along and in contact with a fixed plate 86 extending a substantial distance below the discharge chute 82 and closing the open side of the receptacle below the chute. The plate 85 is operated vertically by a cam 87 on a shaft 88, and an adjacent cam 89 on this shaft is adapted to reciprocate a plunger 90 for raising the receptacle 81 to the dispensing position of Fig. 19. The cams are so constructed that on each rotation of the shaft 88 the cam 87 raises the plate 85 the distance illustrated in Figs. 14–19 and the cam 89 raises the plunger a distance causing its foot 91 to contact the receptacle 81 and raise it to a position flush with the discharge chute 82. When the stops are adjusted to the uppermost position illustrated in Figs. 14–16 the receptacle remains immovable in such position and is adapted to dispense the minimum batch.

When it is desired to dispense larger batches the stops are backed off as illustrated in Figs. 17–19 to a position giving the required receptacle capacity, and a corresponding measured quantity of the material is dispensed at each rotation of the shaft 88. In its initial position in the cycle the cut-off plate 85 closes the chute 82 and leaves open the passage from the hopper into the measuring receptacle (Fig. 17). The receptacle is thereupon filled from the hopper. Upward movement of the plate thereafter cuts off said passage while leaving the chute passage closed (Fig. 18). During continued rotation of the shaft the plate 85 and receptacle 81 are raised simultaneously to their topmost positions (Fig. 19). In such position the receptacle is flush with the chute 82 and the opening 92 through the plate permits discharge of the material.

It will be noted that in the apparatus illustrated in Figs. 14–20 the discharge chute 81 is disposed directly beneath the hopper whereas in the apparatus illustrated in Figs. 1–13 the chute is located a substantial distance beneath the hopper, this latter spacing of the chute being required to provide for vertical adjustment of the measuring receptacle 14. Thus the form of invention illustrated in Figs. 14–20 requires less vertical space to accommodate the apparatus and also requires a shorter cut-off plate stroke.

It will now be apparent that I have produced an extremely simple and highly efficient dispensing apparatus of the nature described and which is adapted to dispense measured batches of fragile products without injury to or crushing or breaking of the product.

Having thus described my invention what I claim as new and desire to secure by Letters Patent of the United States is:

1. A dispensing apparatus comprising a frame, a hopper and a measuring receptacle on the frame, the hopper and receptacle being relatively adjacent but on opposite sides of a vertical plane therebetween, the hopper having a bottom wall sloping downwardly toward said plane and a side wall adjacent to but out of said plane and extending downwardly short of the bottom wall to provide an exit passage therebetween, the receptacle providing a chamber disposed beneath the lowermost end of the bottom wall in position to receive material sliding down the bottom wall and through the passage, cut-off means in said plane movable vertically and relatively of the hopper and receptacle to one position in which it permits flow of material by gravity from the hopper through said passage and into the receptacle and prevents discharge by gravity from the receptacle and to another position in which it cuts off said flow of material and permits discharge flow of material by gravity from the receptacle, and means for reciprocating said cut-off means vertically to and between said positions.

2. The dispensing apparatus defined in claim 1 in which the cut-off means comprises a single cut-off plate in said plane.

3. The dispensing apparatus defined in claim 1 in which the cut-off means comprises two cut-off plates in said plane, one plate serving to control flow of material from the hopper into the receptacle and the other plate serving to control discharge flow of material from the receptacle, and means for operating said plates in synchronism alternately to said positions.

4. The dispensing apparatus defined in claim 1 plus means supporting the receptacle for adjustment vertically to different positions changing the capacity thereof beneath said lowermost end of the bottom wall.

5. A dispensing apparatus comprising a frame, a hopper carried by the frame, a measuring receptacle mounted for vertical movement on the frame, stop means for limiting downward movement of the receptacle, the hopper and receptacle being relatively adjacent but on opposite sides of a vertical plane therebetween, the hopper having a bottom wall sloping downwardly toward said plane and a side wall adjacent to but out of said plane and extending downwardly short of the bottom wall to provide an exit passage therebetween, the receptacle providing a chamber disposed beneath the lowermost end of the bottom wall in position to receive material sliding down the bottom wall and through the passage, cut-off means movable vertically and relatively of the hopper and receptacle to one position in which it permits flow of material from the hopper through said passage and into the receptacle and prevents discharge from the receptacle and to another position in which it cuts off said flow of material and permits discharge flow of material from the receptacle, and means operated synchronously with the cut-off means for raising the receptacle at each discharging operation thereof.

6. The dispensing apparatus defined in claim 5 in which said stop means is adjustable for variably limiting downward movement of the receptacle and in which the last named means is adapted to raise the receptacle from any adjusted down position to a predetermined top position.

7. A dispensing apparatus comprising a frame, a hopper carried by the frame, a measuring receptacle mounted for vertical movement on the frame and having a downwardly sloping bottom wall a discharge chute adapted to cooperate with the lowermost end of the bottom wall to receive material discharged from the receptacle, stop means for limiting downward movement of the receptacle, the hopper and receptacle being relatively adjacent but on opposite sides of a vertical plane therebetween, the hopper having a bottom wall sloping downwardly toward said plane and a side wall adjacent to but out of said plane and extending downwardly short of the hopper bottom wall to provide an exit passage therebetween, the receptacle providing a chamber disposed beneath the lowermost end of the hopper bottom wall in position to receive material sliding down such wall and through the passage, a cut-off plate in said plane movable vertically and relatively of the hopper and receptacle to one position in which it permits flow of material from the hopper through said passage and into the receptacle and prevents discharge from the reecptacle and to another position in which it cuts off said flow of material and permits discharge flow of material from the receptacle, and means operated synchronously with the cut-off plate for raising the receptacle at each discharging operation thereof to a position wherein said lowermost end of the receptacle bottom wall is at an elevation at least equal to that of the adjacent end of the chute.

GRAYDON SMITH.